(12) United States Patent
Miller et al.

(10) Patent No.: US 7,413,603 B2
(45) Date of Patent: Aug. 19, 2008

(54) FIBERBOARD WITH IMPROVED WATER RESISTANCE

(75) Inventors: David Paul Miller, Lindenhurst, IL (US); Srinivas Veeramasuneni, Round Lake, IL (US)

(73) Assignee: United States Gypsum Company, Chicago, IL (US)

( * ) Notice: Subject to any disclaimer, the term of this patent is extended or adjusted under 35 U.S.C. 154(b) by 389 days.

(21) Appl. No.: 11/215,048

(22) Filed: Aug. 30, 2005

(65) Prior Publication Data

US 2007/0056478 A1 Mar. 15, 2007

(51) Int. Cl.
*B32B 25/02* (2006.01)
*C04B 11/00* (2006.01)
*C04B 28/14* (2006.01)
*C04B 9/04* (2006.01)

(52) U.S. Cl. .................. 106/781; 106/780; 156/39; 156/41; 264/122; 264/101; 264/319; 264/331.11; 264/333; 428/294.7; 428/295.1; 428/446; 428/447; 428/703

(58) Field of Classification Search ............... 106/781, 106/780; 156/39, 41; 264/122, 101, 319, 264/331.11, 333; 428/294.7, 295.1, 446, 428/447, 703
See application file for complete search history.

(56) References Cited

U.S. PATENT DOCUMENTS

| | | | |
|---|---|---|---|
| 3,957,715 A * | 5/1976 | Lirones et al. | 264/66 |
| 4,350,533 A * | 9/1982 | Galer et al. | 106/695 |
| 5,320,677 A | 6/1994 | Baig | |
| 5,683,635 A * | 11/1997 | Sucech et al. | 264/42 |
| 5,817,262 A | 10/1998 | Englert | |
| 6,010,596 A | 1/2000 | Song | |
| 6,197,235 B1 | 3/2001 | Miller et al. | |
| 6,413,376 B1 | 7/2002 | Miller | |
| 6,416,695 B1 | 7/2002 | Miller | |
| 6,531,210 B1 | 3/2003 | Englert | |
| 6,605,186 B2 | 8/2003 | Miller | |
| 6,699,364 B2 | 3/2004 | Song | |
| 6,733,261 B2 | 5/2004 | Miller | |
| 2002/0192510 A1 * | 12/2002 | Naji et al. | 428/703 |
| 2005/0161853 A1 | 7/2005 | Miller | |
| 2006/0035112 A1 * | 2/2006 | Veeramasuneni et al. | 428/703 |
| 2007/0022913 A1 * | 2/2007 | Wang et al. | 106/697 |

OTHER PUBLICATIONS

Miller, D. Paul, Michael R. Lynn, and Mark H. Englert. 1995. USG Process for Manufacturing Gypsum Fiber Composite Panels. In: Proceedings of the 4th International Inorganic-Bonded Wood & Fiber Composite Materials Conference vol. 4. Published by the Forest Products Research Society. Madison, WI. A.A. Moslemi editior pp. 47-51, no month.

Englert, Mark H., D. Paul Miller, and Michael R. Lynn. 1995. Properties of Gypsum Fiberboard Made by the USG Process. In: Proceedings of 4th International Inorganic-Bonded Wood & Fiber Composite Materials Conference. Spokane Washington. vol. 4. Published by the Forest Products Society. Madison, WI. A.A. Moslemi editor pp. 52-58, no month.

Miller, D. Paul, Michael R. Lynn, and Mark H. Englert. 1995. USG Process for Manufacturing Fiber Composite Panels. International Cement Review. Nov. pp. 41-42, no month.

Miller, D. Paul and M.R. Lynn. 1988. Development and Scale-Up of USG's Gypsum Fiberboard Technology. In: Proceedings of the 6th International Inogranic-Bonded Wood & Fiber Composite Materials Conference, Sun Valley, Idaho. vol. 6. A.A. Moslemi editor. pp. 4-12, no month.

Miller, D. Paul. 2000. Commercial Scale-Up Experience with USG's Gypsum Fiberboard Process. In: Proceedings of 7th International Inorganic-Bonded Wood & Fiber Composite Materials Conference. Sun Valley, Idaho. vol. 7, A.A. Moslemi editior pp. 337-355.

* cited by examiner

*Primary Examiner*—Elizabeth D Wood
(74) *Attorney, Agent, or Firm*—Greer, Burns & Crain, Ltd.; David F. Janci, Esq.; Pradip Sahu, Esq.

(57) ABSTRACT

Articles, including fiberboard, are made from a pumpable, flowable slurry including alpha-calcined calcium sulfate hemihydrate anchored in pores of host particles, alpha-calcined calcium sulfate hemihydrate, a silicone compound, magnesium oxide, and water. The magnesium oxide catalyzes the reaction of the silicone compound into a silicone resin. In a preferred method of making a water resistant fiberboard calcium sulfate dihydrate is combined with the host particles and water to form a slurry which is heated under pressure to calcine the calcium sulfate dihydrate to form alpha-calcined calcium sulfate hemihydrate. After relieving the pressure, a silicone compound and magnesium oxide are added to the slurry. The slurry is dewatered to form a filter cake, which is then formed into a desired shape and allowed to set.

20 Claims, No Drawings

FIBERBOARD WITH IMPROVED WATER RESISTANCE

BACKGROUND OF THE INVENTION

Gypsum products are commonly used in industrial and building products, particularly gypsum panels or wallboard, due to their ready availability and low cost. By dehydrating and rehydrating gypsum, also known as calcium sulfate dihydrate or landplaster, it can be formed into articles of many useful shapes. Gypsum products are fire retardant, at least in part due to the association of two water molecules with each calcium sulfate molecule. Without reinforcing materials, formed, dry gypsum is relatively brittle, and cannot support heavy loads or sustain impacts of significant force.

The addition of host materials, such as wood or paper fibers, is known to improve the tensile and flexural strength of wallboard. However, the reduction in calcium sulfate dihydrate and the addition of flammable material reduces the fire retardency of the finished product and is more costly.

Attempts to make particle reinforced gypsum products without paper facings, such as fiberboard, have not yielded the improvements in strength that were expected. While not wishing to be bound by theory, it is believed that the lack of bonding between the gypsum particles and the reinforcing particles allows separation at the interface, and the inability of the composite to form a sturdy board.

In U.S. Pat. No. 5,320,677 to Baig, it was disclosed that a strong composite product could be made by mixing calcium sulfate dihydrate with wood particles prior to calcination of the gypsum. After a dilute slurry is formed of gypsum and particles, it is heated under pressure to at least 140° C. to convert the calcium sulfate dihydrate into the alpha form of calcium sulfate hemihydrate, also known as stucco or plaster of Paris. The alpha form used in this process is characterized by the formation of elongated, acicular crystals. As the crystals form, some of them will form within pores, cavities and other imperfections in the particle surface. When the slurry cools, the stucco rehydrates, forming an interlocking matrix of gypsum crystals and reinforcing particles.

There has also been a considerable amount of work on improving the water resistance of gypsum products. Hydrocarbons, including wax and asphalt are suggested to reduce water uptake in U.S. Pat. No. 2,198,776. Inorganic materials including metallic soaps and silicones have been used as coatings on the surface of the finished gypsum product. Water-resistance of products using wax, for example, is not very reproducible. Results from the current wax system used at the manufacturing facility is variable, so the wax is overused (at a higher overall cost) to safely keep the immersion values within an acceptable level.

The prior art teaches that siloxanes are useful when added to the slurry in the form of an emulsion. A siloxane emulsion was added to fiberboard products in U.S. Pat. No. 5,817,262 to Englert. The stable emulsion was added to the aqueous slurry of gypsum after calcinations then rehydrated. A filter cake was formed by dewatering the slurry, pressing the filter cake over porous surfaces. The cake was then allowed to set, then dried in a conventional kiln. However, this board lacked the strength that was expected.

It is an object of the present invention to provide a fiberboard panel having improved water resistance combined with higher strength.

SUMMARY OF THE INVENTION

These and other objects are met or exceeded by the present invention that includes the addition of a water-resistance additive to gypsum fiberboard in the presence of a catalyst which leads to formation of a board having both improved strength and better water resistance.

More specifically, articles, including fiberboard, are made from a pumpable, flowable slurry including calcined calcium sulfate alpha-hemihydrate anchored in pores of host particles, calcined calcium sulfate alpha-hemihydrate, a silicone compound, magnesium oxide, and water. The magnesium oxide catalyzes the reaction of the silicone compound into a silicone resin.

In a preferred method of making a water resistant fiberboard calcium sulfate dihydrate is combined with the host particles and water to form a slurry which is heated under pressure to calcine the calcium sulfate dihydrate to form calcined calcium sulfate alpha-hemihydrate. After relieving the pressure, a silicone compound and magnesium oxide are added to the slurry. The slurry is dewatered to form a filter cake, then the cake is form into a desired shape and allowed to set.

It has also been found that it is not necessary to use a true emulsion for effective use of siloxanes in gypsum slurries. The siloxane can be formed into a dispersion that remains stable for a time sufficient for the product to be formed, set and dried. When compared with boards made with siloxane emulsions, board made from a slurry that includes siloxane dispersed in water has increased strength.

Water resistance of the present fiberboard is improved. The magnesium oxide catalyst used, results in more rapid and complete polymerization of the siloxane, imparting additional water repellency to the product. These results are achieved without negatively altering the physical properties of the fiberboard.

DETAILED DESCRIPTION OF THE INVENTION

Particle reinforced gypsum articles of the present invention are made by forming a pumpable, flowable gypsum slurry. The primary component of the slurry is a gypsum-containing material. The starting gypsum-containing material includes calcium sulfate dihydrate in any of its forms, including landplaster, terra alba and any synthetic equivalent or mixtures thereof. One preferred gypsum is KCP gypsum, a synthetic gypsum made as a byproduct of power plant flue gas cleaning by Allegheny Energy Supply (Willow Island, W. Va.). Other suitable gypsum products, including landplaster and terra alba, are available from United States Gypsum Company, Gypsum, Ohio. Wet gypsum can be used in the slurry without first drying it, unlike conventional paper-faced drywall. Preferably, the gypsum is of a relatively high purity, and is finely ground. The particle distribution of the gypsum preferably includes at least 92% of the particles at minus 100 mesh or smaller. The gypsum can be introduced as a dry powder or as an aqueous slurry.

Another component of the gypsum slurry is a host particle. A "host particle" is intended to refer to any macroscopic particle, such as a fiber, a chip or a flake, of any substance that is capable of reinforcing gypsum. The particle, which is generally insoluble in the slurry liquid, should also have accessible voids therein; whether pits, cracks, crevices, fissures, hollow cores or other surface imperfections, which are penetrable by the slurry and within which calcium sulfate crystals can form. It is also desirable that such voids are present over an appreciable portion of the particle. The physical bonding between the host particle and the gypsum will be enhanced where the voids are plentiful and well distributed over the particle surface. Preferably, the host particle has a higher tensile and flexural strength than the gypsum. A lignocellulosic fiber, particularly a wood or paper fiber, is an example of a host particle well suited for the slurry and process of this invention. About 0.5 to about 30% by weight of the host particles are used, based on the weight of the gypsum-containing component. More preferably, the finished product includes about 3% to about 20% by weight, more preferably from about 5% to about 15% host particles. Although the discussion that follows is directed to a wood fiber, it is not intended to be limiting, but representative of the broader class of suitable compounds useful here.

Preferably, the wood fiber is in the form of recycled paper, wood pulp, cardboard, wood flakes, other lignocellulosic fiber source or mixtures thereof. Recycled cardboard containers are a particularly preferred source of host particles. The particles may require prior processing to break up clumps, separate oversized and undersized material, and in some cases, pre-extract contaminates that could adversely affect the calcination of the gypsum, such as hemicellulose, flavanoids and the like.

Another component of the present invention is a silicon compound capable of forming a silicone network in the gypsum matrix. Preferably, the silicone compound is a low molecular weight hydrogen modified siloxane adapted to polymerize into a silicone polymer. The silicone compound is preferably added in the form of an emulsion, colloid or dispersion in water. Any mixture of the silicone compound and water that keeps the silicone compound substantially dispersed until the silicone polymer forms is suitable for use in this invention.

Although the prior art utilizes a siloxane emulsion, in the present invention the siloxane is preferably used without forming a true emulsion. Water and the silicone compound are preferably combined in a high intensity mixing device that creates a fine dispersion of the silicone oil in water. The dispersion is preferably injected into the gypsum slurry between autoclaving calciners and static mixer upstream of a forming process. The silicone compound selected must be adapted to cure or polymerize into a silicone polymer in the presence of magnesium oxide during the drying step to provide improved water resistance to the finished product. A preferred silicone compound is SILRES BS 94 by Wacker Chemical Corporation (Adrian, Mich.).

Preferably, the silicone component is present in amounts ranging from about 0.08% to about 1% based on the weight of the gypsum containing material. More preferably, the silicone component is present in amounts of about 0.2 to about 0.8% by weight or from about 0.4% to about 0.5%. The silicone compound selected is preferably chemically stable with respect to the gypsum and the wood fibers which make up the gypsum product. The silicone component preferably does not interfere with any additives to modify the physical properties or set time of the gypsum, and is adapted to cure at the core temperature achieved by the article during final drying of the product.

Water resistance is imparted to the gypsum article by the presence of a silicone polymer that is dispersed throughout the gypsum matrix. This is achieved by the addition of the siloxane and catalyst solution which disperses throughout the slurry. Magnesium oxide, also known as "magnesia", is required to catalyze the silicone compound. Formation of the silicone polymer in situ assures that the polymer and resulting water resistance are distributed throughout the finished product. Preferably, the magnesium oxide is present in amounts from about 0.08% to about 1.5% based on the weight of the gypsum component. Preferably, the magnesium oxide is present in amounts of about 0.3% to about 1.0%, and more preferably from about 0.5% to about 1.0%.

There are at least three grades of magnesium oxide on the market, depending on the calcination temperature. "Dead-burned" magnesium oxide is calcined between 1500° C. and 2000° C., eliminating most, if not all, of the reactivity. MagChem P98-PV (Martin Marietta Magnesia Specialties, Bethesda, Md.) and BayMag 96 (Baymag, Inc. of Calgary, Alberta, Canada) are examples of a "dead burned" magnesium oxide. MagChem 10 (Martin Marietta Magnesia Specialties, Bethesda, Md.) is an example of "hard-burned" magnesia. "Hard-burned" magnesium oxide is calcined at temperatures from 1000° C. to about 1500° C. It has a narrow range of reactivity, a high density, and is normally used in application where slow degradation or chemical reactivity is required, such as in animal feed and fertilizer. The third grade is "light-burn" or "caustic" magnesia, produced by calcining at temperatures of about 700° C. to about 1000° C. This type of magnesia is used in a wide range of applications, including plastics, rubber, paper and pulp processing, steel boiler additives, adhesives and acid neutralization. Examples of light burned magnesia include BayMag 30, BayMag 40, and BayMag 30 (−325 Mesh) (BayMag, Inc. of Calgary, Alberta, Canada). Use of dead burned magnesium oxide is preferred. High activity of the light burned magnesium oxide results in unwanted reactions that generate hydrogen, causing the product to expand and crack as it sets.

A catalyst slurry is made by mixing the magnesium oxide in water. A sufficient amount of water is used to form a dilute, pumpable slurry. Many different water sources are useful, including fresh water, water recycled from this process or water recycled from other processes, such as gypsum board manufacturing processes. The magnesium oxide is metered into a mixing tank using a weight loss or volumetric feeder method well known to those skilled in the art. Water is continuously fed to the tank and high intensity mixing is used to disperse the powder into the liquid phase. The resulting catalyst slurry is then injected into the gypsum slurry using a positive displacement pump, preferably a progressing cavity pump.

After mixing the slurry of host particles and gypsum, it is heated under pressure to calcine the gypsum, converting it to calcium sulfate alpha hemihydrate. While not wishing to be bound by theory, it is believed that the dilute slurry wets out the host particle, carrying dissolved calcium sulfate into the voids and crevices therein. The hemihydrate eventually nucleates and forms crystals in situ in and on the voids of the host particle. The crystals formed are predominantly acicular crystals which fit into smaller crevices in the host particle and anchor tightly as they form. As a result, calcium sulfate alpha hemihydrate is physically anchored in the voids of the host particles. Crystal modifiers, such as alum, are optionally added to the slurry (General Alum & Chemical Corporation, Holland, Ohio). A process for making gypsum fiberboard with alum is described in U.S. Patent Publication No. 2005/0161853, published Jul. 28, 2005, herein incorporated by reference.

Elevated temperatures and pressures are maintained for a sufficient time to convert a large fraction of the calcium sulfate dihydrate to calcium sulfate hemihydrate. Under the conditions listed above, approximately 15 minutes is sufficient time to solubilize the dihydrate form and recrystallize the alpha hemihydrate form. While under pressure in the autoclave, it is believed that the dissolved calcium sulfate alpha hemihydrate crystals form within and penetrate the crevices and spaces of the host particles, using the host particle as nucleation sites from which to anchor and grow long, acicular crystals. When calcining is complete, the pressure on the autoclave is relieved to atmospheric pressure, and the optional additives are added to the slurry. After formation of the fiber-rich hemihydrate, the slurry is optionally flash dried as the alpha-hemihydrate for later use.

The slurry temperature is used to control the onset of rehydration. At temperatures below 160° F., the interlocking matrix of dihydrate crystals reforms, where some of the dihydrate crystals are anchored in the voids of the host particles. This results in a very strong dihydrate crystal matrix into which the host particles have been incorporated. After formation of the dihydrate matrix, the silicone polymer matrix is also formed, from the siloxane molecules. Since both of the matrices are formed from repeating units that are scattered throughout the slurry, an intertwined system of both the dihydrate crystal matrix and the silicone polymer matrix is formed, with the silicone matrix forming around the gypsum matrix. The magnesium oxide is distributed throughout the product article surrounded by the silicone polymer matrix.

Optional additives are included in the product slurry as desired to modify properties of the finished product as desired. Accelerators (up to about 35 lb./MSF (170 g/m2)) are added to modify the rate at which the hydration reactions take place. A preferred set accelerator, HRA (United States Gypsum Company, Gypsum, Ohio), is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Alum is also optionally added to fiberboard for set acceleration. Alum has the added advantage of aiding in the flocculation of small particles during dewatering of the slurry. Additional water-resistance materials, such as wax, are optionally added to the slurry. The additives, which also include preservatives, fire retarders, and strength enhancing components, are added to the slurry when it comes from the autoclave.

It is desirable to continuously agitate the slurry with gentle stirring or mixing to keep all the particles in suspension. After the hemihydrate has formed and precipitated out of solution as long, acicular hemihydrate crystals, the pressure on the product slurry is released as the slurry is discharged from the autoclave. The siloxane emulsion and other desired additives are typically added at this time.

In a preferred embodiment, fiberboard is made from the gypsum slurry. The gypsum-containing component is gypsum and the host particle is paper fiber. Paper slurry is hydrapulped to a 4% suspension and the gypsum is dispersed in water at about 40% solids to form a slurry. These two liquid streams are combined to form a dilute gypsum slurry having about 70% to about 95% by weight water. The gypsum slurry is processed in a pressure vessel at a temperature sufficient to convert the gypsum to calcium sulfate alpha hemihydrate. Steam is injected into the vessel to bring the temperature of the vessel up to between 290° F. (143° C.) and about 315° F. (157° C.), and autogenous pressure. The lower temperature is approximately the practical minimum at which the calcium sulfate dihydrate will calcine to the hemihydrate form within a reasonable time. The higher temperature is about the maximum temperature for calcining without undue risk of fiber decomposition. The autoclave temperature is preferably on the order of about 290° F. (143° C.) to about 305° F. (152° C.).

Following calcining, the additives are injected into the gypsum slurry stream. Some additives may be combined prior to addition to the gypsum slurry. Preferably, the silicone dispersion and the catalyst slurry are separately injected into the gypsum slurry prior to dispensing of the slurry at a headbox. Preferably the additives are dispersed using a large static mixer, similar to that disclosed in U.S. Patent Publication No. 2002/0117559, herein incorporated by reference. Passage of the slurry and additives over the irregular interior surfaces of the static mixer cause sufficient turbulence to distribute the additives throughout the slurry.

While still hot, the slurry is pumped into a fourdrinier-style headbox that distributes the slurry along the width of the forming area. From the headbox, the slurry is deposited onto a continuous drainage fabric where the bulk of the water is removed and on which a filter cake is formed. As much as 90% of the uncombined water may be removed from the filter cake by the felting conveyor. Dewatering is preferably aided by a vacuum to remove additional water. As much water is preferably removed as practical before the hemihydrate cools and is converted to the dihydrate. The formation of the filter cake and its dewatering are described in U.S. Pat. No. 5,320,677, herein incorporated by reference.

The slurry, including a plurality of such host particles, is compacted and formed into any desired shape. Any forming method can be used, including pressing, casting, molding and the like. As a consequence of the water removal, the filter cake is cooled to a temperature at which rehydration may begin. However, it may still be necessary to provide additional external cooling to bring the temperature low enough to effect the rehydration within an acceptable time.

While the filter cake is still able to be shaped, it is preferably wet-pressed into a board or panel of the desired size, density and thickness. If the board is to be given a special surface texture or a laminated surface finish, the surface is preferably modified during or following this step. A method for manufacturing textured panels and a description of panels made therefrom are described in more detail in U.S. Pat. No. 6,197,235, herein incorporated by reference. During the wet-pressing, which preferably takes place with gradually increasing pressure and increasing water removal to preserve the product integrity, two things happen. Additional water is removed, further cooling the filter cake to a temperature where rehydration occurs. The calcium sulfate hemihydrate crystals are converted to dihydrate crystals in situ in and around the wood fibers.

After rehydration is sufficient that the filter cake holds its shape, it is cut, sent to a kiln for drying and trimmed into boards. During the drying step, it is important to raise the temperature of the product high enough to promote evaporation of excess moisture, but low enough that calcination does not occur. It is desirable to dry the product under conditions that allows the product core temperature to reach at least 165° F. (74° C.), more preferably, a core temperature of between about 165° F. (74° C.) and about 190° F. (93° C.) is reached.

When essentially set, the composite material exhibits increased strength, particularly flexural strength due to incorporation of the host particles into the gypsum matrix. The silicone resin acts as a coating and binder to protect the host particles, often reducing exposure of the host particles to moisture and the resulting expansion.

In the examples that follow, water absorption was tested according to ASTM Standard D 1037, herein incorporated by reference. Samples of product material, 5 inches (12.5 cm) per side, are weighed at the beginning of the test to establish a dry weight. The samples are then immersed in water for two hours and reweighed to determine the wet weight. The amount of water absorbed, as a percentage of the dry weight, is then calculated as the difference between the wet weight and the dry weight divided by the dry weight, all multiplied by 100. Unless otherwise noted, all amounts are on a dry weight basis.

EXAMPLE 1

Water resistance of fiberboard samples was tested by measuring the amount of water absorbed when the samples were immersed in water for a predetermined time period. The sample was generally considered water resistant if the weight of the sample after immersion was less than 10% greater than the dry sample weight, while the target water absorption was less than 5% for some embodiments.

The base composition of the fiberboard is shown in Table I. BS 94 siloxane and dead-burned magnesium oxide were added in the amounts listed in Table II.

Data was obtained on a pilot plant continuously producing two feet per minute of fiberboard and included 15% by weight host particles of which 10% was paper fiber. The gypsum was a synthetic gypsum from Gypsum, Ohio. Control samples have no water resistance additive. SILRES BS 94 siloxane and dead burned magnesium oxide were supplied as noted in Table II. Liquid alum (48% solids) was added as a crystal modifier at the rate of 1 liter per 100 gallons of slurry.

TABLE I

| Component | Weight, lbs. (Kg) |
| --- | --- |
| Paper Fiber | 14.4 (6.5) |
| Weight of slurry | 906.8 (412.2) |
| Slurry solids | 136.0 (61.8) |
| Gypsum | 122.4 (55.6) |
| Wet KCP Gypsum | 101.0 (45.9) |
| Terra Alba | 30.6 (13.9) |
| HRA | 1.2 (0.5) |

The SILRES BS 94 siloxane was measured and added to water in a high shear Ross Mixer. Drives on the pilot plant were set to 2 ft/min and a 4-inch forming board. The pilot plant calcining reactors were preheated for 30 minutes, then drained. Steam was added to the reactors at 295° F. for an additional 30 minutes before the slurry was introduced to the reactors. Calcined slurry was combined with HRA and alum additive slurries directly injected upstream of a static mixer upstream of the headbox. Resulting slurry was dewatered, pressed and allowed to set prior to drying to remove excess water. Dried panels were then cut to dimensions and samples for immersion testing cut from the resulting boards. The samples were soaked in water for two hours for the water absorption test as specified in ASTM C1037, herein incorporated by reference. The weight gain during the soaking was used to calculate the water absorption.

TABLE II

| Sample | BS 94 Siloxane | MgO | 1 Day Absorption | 7 Day Absorption | Density, lb/ft3 (g/cc) |
| --- | --- | --- | --- | --- | --- |
| Control 1 | 0 | 0 | 51.51% | 54.55% | 57.08 (0.915) |
| 2 | 0.5% | 0.5% | 9.51% | 6.75% | 56.35 (0.903) |
| 3 | 0.3% | 0.5% | 8.95% | 6.31% | 55.73 (0.901) |
| 4 | 0.3% | 0.4% | 9.22% | 6.14% | 56.22 (0.901) |
| 5 | 0.5% | 0.4% | 9.17% | 6.51% | 56.42 (0.905) |
| 6 | 0.3% | 0.4% | 10.38% | 7.64% | 56.41 (0.904) |
| 7 | 0.3% | 0.5% | 10.53% | 7.17% | 56.48 (0.906) |
| 8 | 0.5% | 0.5% | 9.06% | 6.62% | 56.60 (0.907) |
| 9 | 0.5% | 0.4% | 9.28% | 6.54% | 54.50 (0.874) |
| Control 2 | 0 | 0 | 51.67% | 52.24% | 61.11 (0.980) |

These tests demonstrate the reproducibility of water absorption values less than 10% in fiberboard systems.

EXAMPLE 2

Magnesium oxide was used to catalyze siloxane on a commercial scale plant trial where ½" board was made at 40 feet/minute (12.3 meters/minute). Density of the finished product was 67-69 lb/ft$^3$ (1.13-1.16 g/cc). Amounts of each of the ingredients is shown in Table III. Two different magnesium sources were tested, in slightly different amounts as indicated in the component amounts.

Gypsum and recycled paper fiber were slurried together and pumped through a continuously calcining autoclave at 295° F. (146° C.) for a nominal residence time of 22 minutes. After flashing back to atmospheric temperature and pressure, the remaining additives including MgO, and siloxane, were pumped into the calcined slurry stream.

The resulting gypsum slurry was pumped to a fourdinier style headbox and dewatered through a porous forming fabric. Seven vacuum boxes at vacuums of 4 to 10" Hg were used to facilitate whitewater removal. Water was allowed to pass through the openings in the felting wire. After initial water removal on the forming table, additional vacuum was applied in combination with pressure to further consolidate the mat. After a portion of the rehydration or set had occurred, additional pressing was used to generate the desired panel thickness as well as imparting other desireable physical and mechanical properties.

The set panels were dried in a batch dryer of constant temperature of 110° F. (43° C.) overnight.

TABLE III

| Component | Amount, weight % |
| --- | --- |
| Recycled Paper Fiber | 5.9 |
| Gypsum | 80.1 |
| Ground Gypsum | 1.5 |
| Siloxane | 0.5 |
| MgO | 1.0 (during P98 use) |
| | 1.0 (during 325 2 use) |

Samples of the board were tested for water absorption according to ASTM C 1037 described above. The results are reported in Table IV below. Fiberboard having less than 5% water absorption on a consistent basis is shown to be manufactured on a commercial scale.

TABLE IV

| Sample | MgO Source | Dry Weight, lb. (kg) | Wet Weight, lb. (kg) | % Absorption |
|---|---|---|---|---|
| A East | P98 | 115.2 (52.4) | 117.0 (53.2) | 1.53% |
| A Cent | P98 | 113.7 (51.7) | 115.3 (52.4) | 1.45% |
| West | P98 | 104.5 (47.5) | 106.6 (48.5) | 2.01% |
| BE | P98 | 104.1 (47.3) | 106.1 (48.2) | 1.86% |
| BC | P98 | 113.5 (51.6) | 115.5 (52.4) | 1.77% |
| BW | P98 | 104.0 (47.3) | 105.9 (48.1) | 1.85% |
| CE | P98 | 107.5 (48.9) | 114.5 (52.0) | 6.57% |
| CC | P98 | 105.4 (47.9) | 116.4 (52.9) | 10.39% |
| CW | P98 | 106.2 (48.3) | 108.2 (49.2) | 1.88% |
| DE | P98 | 104.3 (47.4) | 106.3 (48.3) | 1.87% |
| DC | P98 | 110.3 (50.2) | 112.2 (51.0) | 1.77% |
| DW | P98 | 103.1 (46.9) | 105.1 (47.8) | 1.87% |
| EE | P98 | 105.1 (47.8) | 114.9 (52.2) | 9.43% |
| EC | P98 | 110.5 (50.2) | 112.4 (51.1) | 1.67% |
| EW | P98 | 106.9 (48.6) | 112.9 (51.3) | 5.58% |
| FE | P98 | 102.7 (46.7) | 104.7 (47.9) | 1.98% |
| FC | P98 | 113.2 (51.5) | 115.1 (52.3) | 1.70% |
| FW | P98 | 103.9 (47.2) | 105.9 (48.1) | 1.98% |
| AE | 325 2 | 105.3 (47.9) | 107.3 (48.8) | 1.89% |
| AC | 325 2 | 111.4 (50.6) | 113.3 (51.6) | 1.68% |
| AW | 325 2 | 103.4 (47.0) | 105.8 (48.1) | 1.86% |
| BE | 325 2 | 104.1 (47.3) | 105.9 (48.1) | 1.73% |
| BC | 325 2 | 105.7 (48.0) | 107.4 (48.8) | 1.59% |
| BW | 325 2 | 108.9 (49.5) | 110.8 (50.4) | 1.77% |
| CE | 325 2 | 103.7 (47.1) | 105.6 (48.0) | 1.84% |
| CC | 325 2 | 109.7 (49.9) | 111.6 (50.7) | 1.73% |
| CW | 325 2 | 105.9 (48.1) | 107.6 (48.9) | 1.61% |

This data demonstrates that fiberboard exhibiting less than 5% water absorption is obtainable on a commercial scale.

EXAMPLE 3

A P98 magnesium oxide catalyzed siloxane having a composition as in Example 2 was compared to water resistant board including 2.5% wax. All products were made and tested by the same methods taught in Example 2. Target absorption was less than 5% water absorbed. Samples 1, 2 and 3 made with SILRES BS 94 siloxane were compared to a conventional fiberboard made with wax.

TABLE V

| Sample | Water Absorption |
|---|---|
| Wax | 3.74% |
| 1 | 3.21% |
| 2 | 3.09% |
| 3 | 3.20% |

This test demonstrates that lower water demand is achievable compared to the more traditional wax-containing fiberboard.

While a particular embodiment of the fiberboard having improved water-resistance has been shown and described, it will be appreciated by those skilled in the art that changes and modifications may be made thereto without departing from the invention in its broader aspects and as set forth in the following claims.

What is claimed is:

1. A pumpable, flowable slurry comprising:
   alpha-calcined calcium sulfate hemihydrate anchored in pores of host particles;
   alpha-calcined calcium sulfate hemihydrate;
   a silicone compound;
   magnesium oxide; and
   water.

2. The slurry of claim 1 wherein said silicone compound is present in amounts of about 0.08% to about 1.0% based on the combined weight of the alpha-calcined calcium sulfate hemihydrate and the alpha-calcined calcium sulfate hemihydrate anchored in pores of host particles.

3. The slurry of claim 1 wherein said magnesium oxide is present in amounts of about 0.08% to about 1.5% based on the combined weight of the alpha-calcined calcium sulfate hemihydrate and the alpha-calcined calcium sulfate hemihydrate anchored in pores of host particles.

4. The slurry of claim 1 wherein said silicone compound comprises a low molecular weight hydrogen modified siloxane.

5. The slurry of claim 1 wherein said host particles comprise at least one of wood fibers and paper fibers.

6. The slurry of claim 1 wherein said magnesium oxide is dead-burned or hard-burned magnesium oxide.

7. The slurry of claim 2 wherein said silicone compound is present in amounts of about 0.4% to about 0.5%.

8. The slurry of claim 4 wherein said hydrogen-modified siloxane is hydrogen-modified methylsiloxane.

9. The slurry of claim 6 wherein said magnesium oxide is dead-burned magnesium oxide.

10. The slurry of claim 3 wherein said magnesium oxide is present in amounts of about 0.3 to about 0.4%.

11. A method of making a water resistant fiber board comprising:
    combining calcium sulfate dihydrate and host particles with water to form a slurry;
    heating the slurry under pressure to calcine the calcium sulfate dihydrate to form alpha-calcined calcium sulfate hemihydrate;
    relieving the pressure;
    adding a silicone compound and magnesium oxide to the slurry;
    dewatering the slurry to form a filter cake;
    forming the cake into a desired shape; and
    allowing the cake to set.

12. The method of claim 11 wherein said forming step comprises felting the slurry to form the cake.

13. The method of claim 12 wherein said dewatering step includes application of a vacuum to the cake.

14. The method of claim 13 further comprising drying the cake in a kiln.

15. A fiberboard article comprising:
    host particles distributed throughout said article, having a plurality of calcium sulfate dihydrate crystals formed in at least one of the group consisting of voids, crevices, pits, cracks, fissures, hollow cores and other surface imperfections in said host particles;
    an interlocking matrix of calcium sulfate dihydrate crystals distributed throughout said article, including one or more crystals from said plurality of calcium sulfate dihydrate crystals formed in said host particles;
    a silicone polymer matrix distributed throughout said article around said calcium sulfate matrix; and
    magnesium oxide distributed throughout said article surrounded by said silicone polymer matrix.

16. The article of claim 15 wherein said magnesium oxide is a dead burned magnesium oxide.

17. The article of claim 15 wherein said silicone is a hydrogen modified siloxane.

18. The article of claim 15 wherein said host particles are wood fibers or paper fibers.

19. The slurry of claim 11 wherein said silicone compound is present in amounts of about 0.08% to about 1% based on the weight of the calcium sulfate dihydrate.

20. The slurry of claim 11 wherein said magnesium oxide is present in amounts of about 0.08% to about 1.5% based on the weight of the calcium sulfate dihydrate.

* * * * *